(12) United States Patent
Yerazunis et al.

(10) Patent No.: US 7,990,542 B2
(45) Date of Patent: Aug. 2, 2011

(54) MEMORY-BASED HIGH-SPEED INTERFEROMETER

(75) Inventors: William S. Yerazunis, Acton, MA (US); Dirk Brinkman, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 264 days.

(21) Appl. No.: 11/923,786

(22) Filed: Oct. 25, 2007

(65) Prior Publication Data

US 2009/0112500 A1    Apr. 30, 2009

(51) Int. Cl.
*G01B 9/02*    (2006.01)

(52) U.S. Cl. .................................................. 356/498

(58) Field of Classification Search .................. 356/498
See application file for complete search history.

(56) References Cited

U.S. PATENT DOCUMENTS

| 4,583,856 | A | | 4/1986 | Moore |
| 4,641,971 | A | * | 2/1987 | Korth ............................ 356/497 |
| 4,886,363 | A | * | 12/1989 | Jungquist ..................... 356/487 |
| 2009/0257067 | A1 | * | 10/2009 | Chapman et al. ............. 356/498 |

FOREIGN PATENT DOCUMENTS

EP    0511117    10/1992

* cited by examiner

*Primary Examiner* — Hwa S. A Lee
(74) *Attorney, Agent, or Firm* — Dirk Brinkman; Gene Vinokur

(57) ABSTRACT

An interferometer produces a first optical signal and a second optical signal interfering with each other. The optical signals are converted digital signals form addresses. A memory stores data values corresponding to the first and second optical signals, and in which the addresses are used to directly read the data values stored at the addresses. The data values stored in the memory can be dynamically adapting while converting the first and second optical signals and reading the data values.

23 Claims, 3 Drawing Sheets

MEMORY-BASED HIGH-SPEED INTERFEROMETER

FIELD OF THE INVENTION

The present invention relates generally to optical measurement devices, and more particularly to high-speed optical interferometers.

BACKGROUND OF THE INVENTION

Interferometry superposes (interferes) two or more (electro-magnetic) waves, to detect differences between the waves, i.e., their interfering characteristics. The most common interferometer is the Michelson type of interferometer. The basic components of the Michelson interferometer are a light source, a detector, two mirrors and one semitransparent mirror, often called a beam splitter.

A simple interferometer counts the "fringes" where the intensity of the output wave runs in a complete cycle from maximum (where the waves constructively interfere) to a minimum (complete destructive interference) and back to a maximum again. These intensities are sine waves. Because of this single output, a simple interferometer can detect a change of differential distance in the path of the wave, but not the direction of this change.

When a phasing arrangement (such as a quarter-wave retarder) is used to generate a pair of paths (usually by having two beams, one in each polarization, operating through the same set of lenses and mirrors) one polarization path is delayed by the quarter-wave retarder so that the resulting sine wave intensity is delayed 90 degrees from the unretarded path. This gives a pair of outputs for the interferometer. These outputs are in quadrature, and like a standard quadrature encoder, can detect both change in distance and the direction of the change.

Unfortunately, the resolution of an interferometer of this form is one quarter of a wavelength of path difference; in the case of a typical interferometer using a helium-neon (HeNe) laser that wavelength is fixed by the physics of helium and neon at 632.818 nanometers and cannot be changed. Thus, the minimum distance directly encoded by the quadrature output of the interferometer is ¼ of the 632.818 wavelength, or 158.20 nanometers. This quarter-wave distance is sometimes called the "native resolution" of the interferometer.

The current state of the art provides further gains in resolution by intensity interpolation; that is, the relative powers of the undelayed and delayed paths are measured by photodiodes, the photodiode current is amplified and converted to digital values by A/D converters, and software is used to map this pair of relative power values as sine and cosine values onto a unit circle. As each of the arcsine or arccosine values yields two possible angles on the unit circle, the two values will produce a total of three simultaneous possible angles on the unit circle, but only one value (the duplicated value) is correct. This unit circle angle divided by $2\pi$ is the fraction of a wavelength that the beam path has changed from the interferometer zero point and in state of the art interferometers can often be as small as 1 part per 100 of a wavelength, or 25 times the native resolution.

The disadvantages of the conventional methods are that the two parts of the readout are of different types: the number of quarter-wavelengths is read out by quadrature encoding in real time, while the fraction of the wavelength is the result of a software interpolation which is delayed by some amount of time. Merging these values together causes yet more delay, so the overall interferometer system does not report on the current position, but on the position at some point in the past, typically at least 50 microseconds in the past. This corresponds to an update rate of about 20 K Hz and by the Hamming theorem, no motion of higher than one half that rate (10 K Hz) can be detected by such an interferometer.

Prior art interferometers are severely limited in their speed, typically in the range of about 20 K Hz, and often much less. Many marketed interferometers have update rates as low as 10 to 20 Hz. Conventional interferometers are usually fixed, and configured for a particular operating condition. Changing the operation of the interferometer in real-time is impossible in most cases.

It is desired to increase the speed of interferometers at least a thousand-fold or three orders of magnitude ($10^3$) to well into the Mega-Hertz range. In fact, it desired to increase the speed so that the speed of the interferometer is mainly limited by the speed in which the intensities of optical signals can be converted to digital signals. Thus, as the speed of the conversion increase, so will the speed of the interferometers that use the invention. It is also desired to dynamically adapt the interferometer to its operating characteristics and environment.

The concept of interferometry as an experimental science dates back to Albert Michelson, who was awarded the Nobel Prize in 1907. R. C. Moore in U.S. Pat. No. 4,583,856 uses a computer to calculate the sub-fringe resolution in a laser interferometer. Distance measuring interferometers are commercially available. A top-of-the-line laser interferometer from 4D Technology operates with a sample time of 30 microseconds and updating within one frame time, that is, a 20 K Hz final update rate. The Canon micro-laser interferometer limits the working range to +/−50 microns, this micro interferometer can update at 100 K Hz.

One goal of this invention is to radically increase the speed of the interferometric measurement well up into the M Hz range or greater.

Another goal of this invention is to merge the output formats of the interferometer such that any device reading the interferometer measurements can read the output of the interferometer as any format of value desired, whether that is as a Gray code, as an integer, as quadrature-encoded pulses, or whatever other arbitrary format may be useful. Thus, it is desired to make the interferometer dynamically configurable to any desired data format, perhaps while the device is operating, or in response to its operating characteristics and the environment in which it operates.

SUMMARY OF THE INVENTION

An interferometer produces a first optical signal and a second optical signal interfering with each other.

The optical signals are converted digital signals form addresses. A memory stores data values corresponding to the first and second optical signals, and in which the addresses are used to directly read the data values stored at the addresses.

The data values stored in the memory can be dynamically adapting while converting the first and second optical signals and reading the data values.

DETAILED DESCRIPTION OF THE PREFERRED EMBODIMENTS

Interferometry

Figure 1:
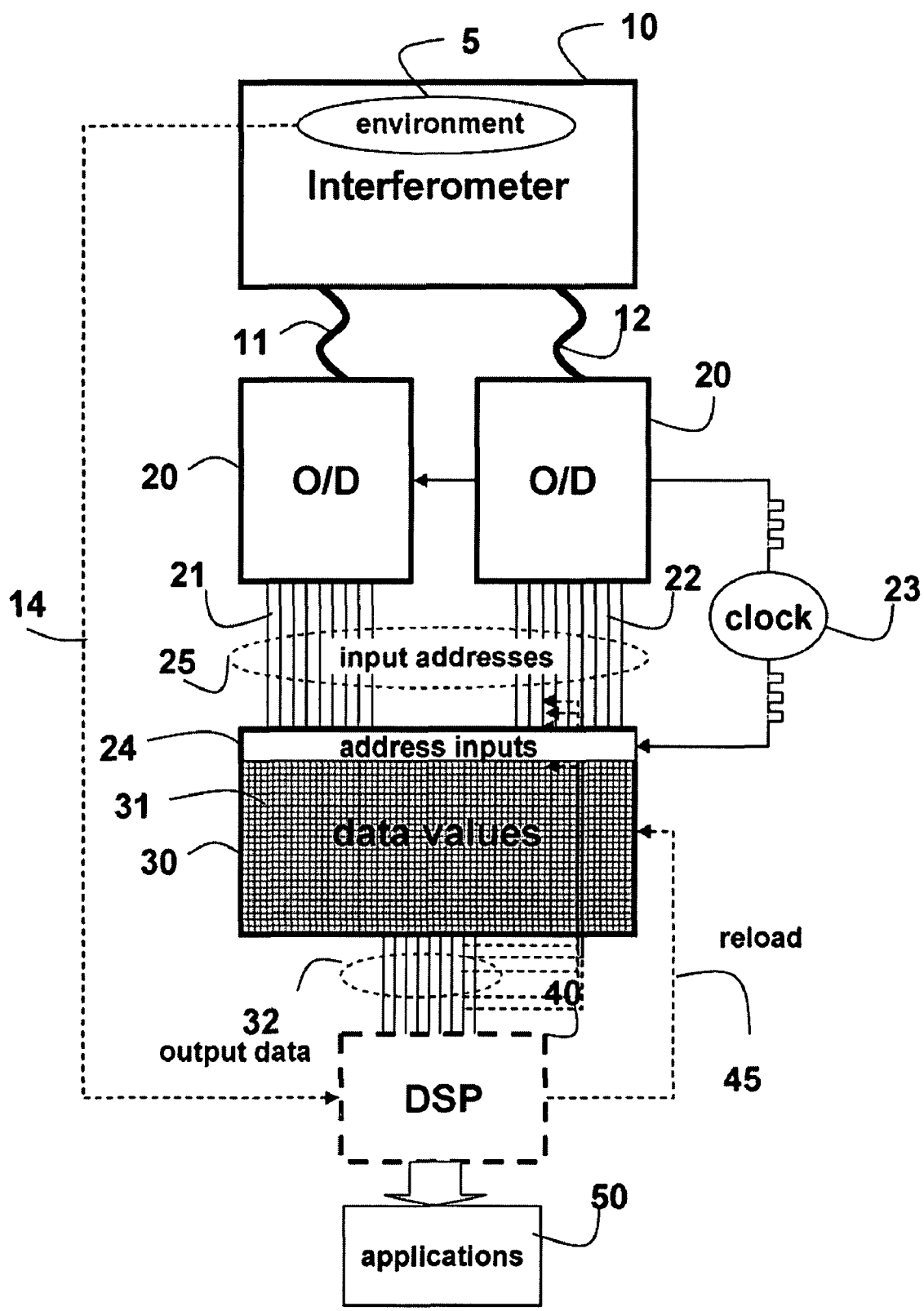
FIG. 1 is a block diagram of an interferometer and corresponding method according to an embodiment of the invention.

Our invention comprises a Michelson-style quadrature laser interferometer with a conventional optical configuration, with the addition of photodiodes, amplifiers, A/D converters and memory. The A/D converters change intensities of the interfering optical signals to digital signals in a form of memory addresses.

Direct Access Memory

Accessing the memory directly converts the amplitude (intensities) of the two quadrature-encoded interferometer beam signals into any desired quadrature encoded positional signal. The high-speed path, after the A/D converters, does not include any software or electronic devices with long latencies. Of course, the down-stream processing of the data read from the memory can use software, and software can be used to configure the system or update the content of the memory during operation, but those operations do not impinge on the high-speed measurement path.

One embodiment of our invention uses the results of the A/D converters to directly and uniquely address (read) a location in a ROM or RAM memory that is preloaded with data that correspond to desired output state for that particular set of intensities of photodiode signals. This output state may be a quadrature-encoded output that simulates an interferometer operating on a different (and very much smaller) wavelength, or a fraction of a wavelength, or any other desired output format, as long as that format repeats every integer multiple of the primary quadrature laser interferometer wavelength.

Our interferometer can count the fringes where the intensities of the optical signals run in a complete cycle from maximum to a minimum. Our interferometer can detect a change and direction of the differential distance in the path of the optical signals. Specifically, we can provide quadrature encodings of the differential distance of an interferometer, in which the encodings are multiple cycles of the differential distance per fringe cycle of the interferometer.

Encodings

The output state from the memory is not limited to quadrature encoded values. For example, situations that are "impossible" for a correctly functioning interferometer to experience can have output indication codes that reflect that situation. For example, in a correctly operating quadrature interferometer, the values of the two beams are never both zero, never both at a maximum, and never both at an intermediate constant. A zero data value indicates a broken laser, while a maximum data value indicates a contaminant on the first beam-splitter surface. Both values of the beams at an intermediate constant indicate that either the reference or target beam is out of alignment. These fault indication conditions and others are all detectable with our invention in real-time. The conditions can be indicated at one or more predetermined bits in the data values.

Up-Down Counter

Another embodiment of our invention adds a quadrature up-down counter that is directly stepped up or downward by thresholded interferometer beam outputs. The output of this up-down counter is used as additional bits in the addressing of the memory, giving our invention the ability to output unique output codes as desired across the entire range supported by the up-down counter.

Dynamically Adaptive Interferometer

In another embodiment of our invention, we dynamically adapt the operation of the interferometer to characteristics of the measurements it acquires or the environmental conditions in which the interferometer operates, e.g., temperature, pressure, humidity, status and commands of the device being measured or the control system of the system being measured. This type of operation is enabled by the fact that the memory is directly in the high speed measuring path.

For example, our invention could be used adaptively in a precision machine tool, where a machine tool computer numerical control (CNC) controller first commands the interferometer into "calibrate" mode, to configure the memory values to optimize accuracy over the full range of motion of the tool, while slewing the tool axis to measure the full range of tool motion, and then put into "measure" mode where the optimal set of values calculated during "calibrate" are used at full M Hz speed to assist in controlling the machine tool.

For another example, the pressure, temperature, and humidity of the air around the machine tool affect the speed of light at the parts-per-million level. By reloading the memory of the invention dynamically and adaptively, the effects of atmospheric pressure, temperature, and humidity can be nulled out, and a precise interferometric distance measure can be obtained under adverse operating conditions.

Interferometer Structure and Operation Overview

FIG. 1 shows the basic structural components and operation of our invention. An interferometer 10 placed in an environment 5 generates first and second optical signals 11-12. Intensities of the optical signals are independently converted 20 to first and second digital signals 21-22 in the form of addresses 25.

A memory 30 stores data values 31 corresponding to possible (and impossible) optical signals the interferometer 10 can produce. The addresses 25 are used to directly access the memory 30 to obtain output data values 32 accessed via addresses input lines 24 of the memory 30.

The addresses inputs 25 of the memory 30 can be clocked (synchronized) 23 to a rate at which the O/D converters 20 operate.

Typically, the output data values 32 of the interferometer are further processed by, e.g., a digital signal processor (DSP) 40 and applications 50. In one embodiment of the invention, the DSP dynamically reloads 45, or otherwise reconfigures the memory 30, based on, e.g., the data 32, or other input signals 14 from the environment 5 in which the interferometer 10 operates. The data values can also be adapted by the application.

Detailed Interferometer Structure and Operation

Figure 2:
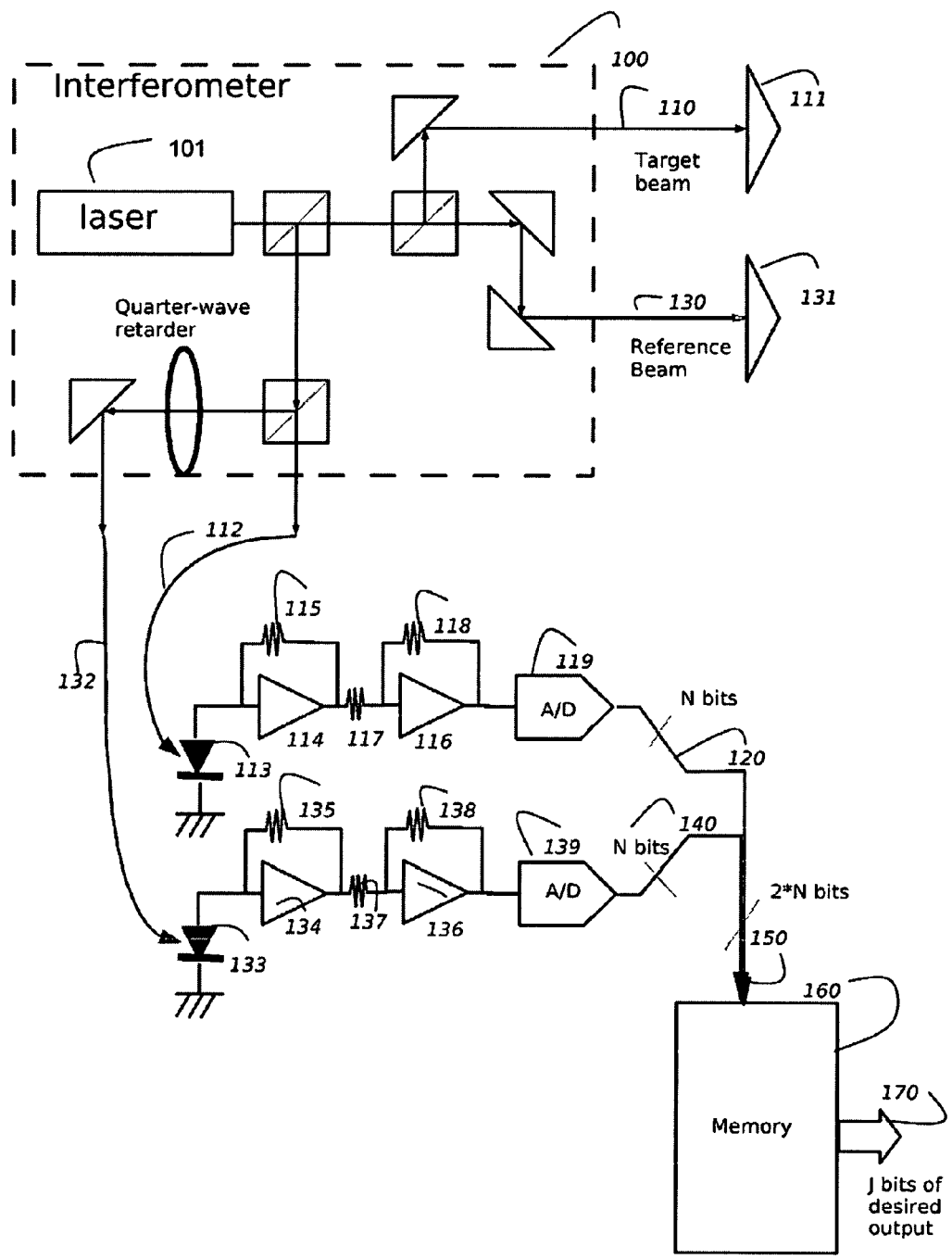
FIG. 2 is a detailed block diagram of an interferometer according to an embodiment of the invention.

FIG. 2 shows the details of one embodiment of our invention. The quadrature laser interferometer 100 directs a pair of coherent laser beams 110 and 130, generated by a laser 101, onto two reflectors 111 and 131, and then mixes the returned beams to produce a pair of quadrature-modulated output beams 112 and 132, respectively encoding the relative positional displacements of reflectors 111 and 131. All optical components such as mirror, beam splitters, retarders are conventional.

The beams 112 and 132 are converted to photocurrents by photodiodes 113 and 133 respectively. The photocurrents are input to transconductance amplifiers. The transconductance amplifiers include op-amps 114 and 134 with feedback resistors 115 and 135 respectively.

The output voltages are amplified by op-amps 116 and 136, with feedback network resistors 117, 118, and 137 and 138 respectively.

The voltages, representing intensities of the optical signals 112 and 132, are converted to digital signals by analog-to-digital converters 119 and 139 respectively.

The output digitized voltage buses 120 and 140 are each N bits wide, and are paralleled to form a 2×N bits wide address bus 150. The 2×N bit wide address bus 150 is applied to the address inputs of a memory 160 with an input address space of 2×N bits, and an output data word width of J bits. It should be noted, that conventional quadrature encoders typically produce only a single output bit. Our converter can produce multiple bits, for example sixteen or more, greatly increasing the resolution of the interferometer.

The memory is pre-loaded with the desired output data values for each possible address in the range of zero to two raised to the 2×N power.

The memory 160 outputs the desired output data values 170 to any buffer/amplifier where it is available to outside systems and applications for further processing.

Up-Down Counter

Figure 3:
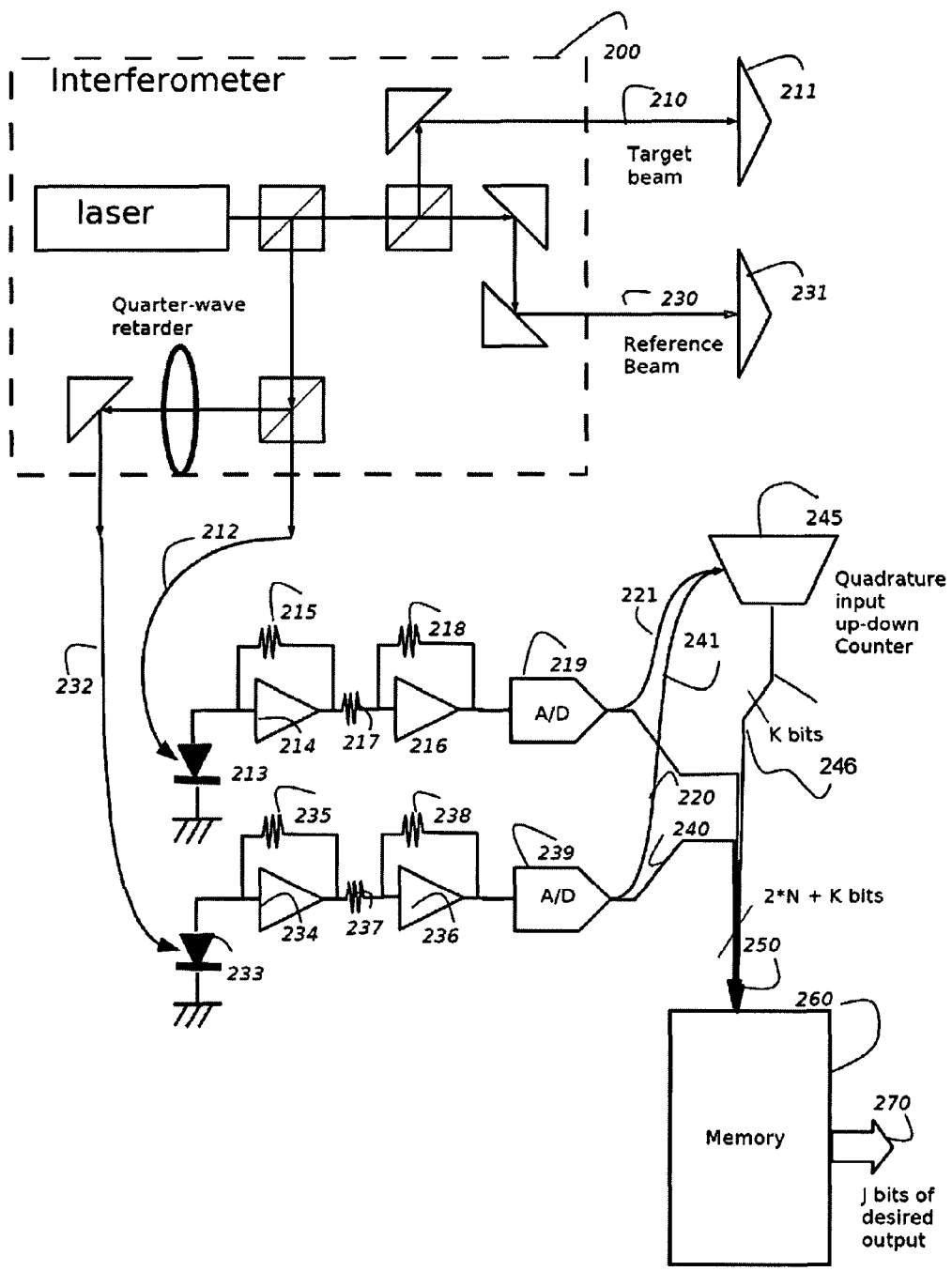
FIG. 3 is a detailed block diagram of an interferometer according to another embodiment of the invention.

FIG. 3 shows another embodiment of our invention with a quadrature input up-down counter 245.

The quadrature laser interferometer 200 directs a pair of coherent laser beams 210 and 230 onto two reflectors 211 and 231, and then mixes the returned beams to produce a pair of quadrature-modulated output beams 212 and 232 respectively encoding the relative positional displacements of reflectors 211 and 231.

These beams are converted to photocurrents by photodiodes 213 and 233 respectively. The photocurrents are input to transconductance amplifiers composed of op-amps 214 and 234 with feedback resistors 215 and 235 respectively, and the output voltages are amplified by op-amps 216 and 236 with feedback network resistors 217, 218, and 237 and 238 respectively.

The voltages are then converted to digital signals by analog-to-digital converters 219 and 239 respectively. The output digitized voltage buses 220 and 240 are each N bits wide, and are paralleled to form a 2×N bits wide bus.

Additionally, the high order bit 221 and 241 respectively of each converter 219 and 239 is applied to the quadrature-input up-down counter 245. The output of the counter is K bits wide.

The 2×N bit wide bus is combined with the K bit wide up-down counter output 246 to form a 2×N+K bit wide address bus 250.

This address bus 250 is applied directly to the address inputs of the memory 260 with an input address space of 2×N+K bits width, and an output data word width of J bits, which has been pre-loaded with the desired output states for each possible address in the range of zero to two raised to the 2×N+K power. The memory 260 outputs the desired output stored data values 270 to a final buffer/amplifier where it is available to outside systems and applications.

EFFECT OF THE INVENTION

The embodiments of the invention provide a memory-based high-speed interferometer. Intensities of interfering optical signals are converted to memory input addresses. Output data values are read directly from a memory at the input addresses. Thus, a speed at which the interferometer operates is primarily limited by the rate at which the memory operates. Because the interferometer is memory-based, stored data values can be adapted to the operating environment.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for interferometry including an optical system producing a first optical signal and a second optical signal, in which the first optical signal and the second optical signal are quadrature-encoded, comprising:
    an optical-to-digital converter configured to convert independently intensities of a first optical signal to a first digital signal of N bits and the intensities of a second optical signal to a second digital signal of N bits, such that a combination of the first digital signal and the second digital signal forms an address signal, and wherein the first optical signal and the second optical signal and the corresponding first digital signal and the second digital signal are independent of each other;
    two buses operatively connected to the optical-to-digital converter to receive the first and the second digital signals respectively, wherein each bus is N bits wide, and are arranged in a parallel to form an address bus for receiving the address signal of a width of at least 2×N bits; and
    a memory having data values loaded in memory addresses in a range of zero to two raised to a power equal to the width of the address signal, wherein the memory is connected directly to the address bus such that the address signal directly reads the data values from the memory, wherein the data values include fault indication codes.

2. The apparatus of claim 1, further comprising:
    a clock synchronizing an operation of the optical-to-digital converter and the memory.

3. The apparatus of claim 1, in which the data values are quadrature encodings of a differential distance of an interferometer.

4. The apparatus of claim 3, in which the data values are multiple cycles of the quadrature encodings of the differential distance per fringe cycle of the interferometer.

5. The apparatus of claim 3, in which the data values are a numeric representation of the differential distance.

6. The apparatus of claim 3, in which the data values are Gray code representation of the differential distance.

7. The apparatus of claim 1, in which the fault indications are provided at one or more predetermined bits in the data values.

8. The apparatus of claim 1, in which the data values stored in the memory are dynamically adapting to an operating environment.

9. The apparatus of claim 1, in which the data values stored in the memory are dynamically adapting to the data values read from the memory.

10. The apparatus of claim 1, in which the data values stored in the memory are dynamically adapting by an application using the data values read from the memory.

11. The apparatus of claim 1, in which the optical-to-digital converter further comprises:
    photodiodes connected to the first optical signal and the second optical signal;
    amplifiers connected to the photodiodes; and
    analog-to-digital converters connected to the amplifiers.

12. The apparatus of claim 1, in which a resolution of the interferometer corresponds to a number of bits in the address signal.

13. The apparatus of claim 1, in which the data values at a rate exceeding one megahertz.

14. The apparatus of claim 13, in which the data values are read at an access rate of the memory.

15. The apparatus of claim 1, further comprising:
   a counter operatively connected to the optical-to-digital converter to receive high order bits of the first digital signal and the second digital signals respectively to produce an output of K bits wide, wherein the counter combines the output with the address signal such that the width of the address signal is a 2×N+K bit wide.

16. A method for processing a first optical signal and a second optical signal produced by an interferometer, in which the first optical signal and the second optical signal are quadrature-encoded, comprising:
   converting the first optical signal to a first digital signal representing intensities of the first optical signal;
   converting the second optical signal to a second digital signal representing intensities of the second optical signal;
   combining in parallel the first digital signal and the second digital signal to form an address signal; and
   accessing a memory with the address signal in such a way that the address signal directly reads data values corresponding to a differential distance of the interferometer, wherein the data values include fault indication codes.

17. The method of claim 16, further comprising:
   synchronizing an operation of the optical-to-digital converter and the memory.

18. The method of claim 16, further comprising:
   adapting dynamically the data values stored in the memory while converting the first optical signal and the second optical signal and reading the data values.

19. The method of claim 16, in which the data values are quadrature encodings of the differential distance of the interferometer.

20. The method of claim 18, in which the data values stored in the memory are dynamically adapting to an operating environment.

21. The method of claim 19, in which a resolution of the interferometer corresponds to a number of bits in the address signals.

22. The method of claim 16, further comprising:
   storing the data values in the memory.

23. The method of claim 16, further comprising:
   applying high order bits of the first and the second digital signals respectively to a counter to produce an output having a width of K bits; and
   combining the output with the address signal such that a width of the address signal is increased by the width of the output.

* * * * *